United States Patent
Schwenker et al.

(10) Patent No.: US 6,215,900 B1
(45) Date of Patent: Apr. 10, 2001

(54) IMAGE DATA PROCESSING FOR DIGITAL X-RAY DETECTORS

(75) Inventors: Ronald P. Schwenker, deceased, late of Chadds Ford, PA (US), by Emily J. Schwenker, legal representative; Cornell L. Williams, Pennsauken, NJ (US)

(73) Assignee: Direct Radiography Corp., Newark, DE (US)

(*) Notice: Subject to any disclaimer, the term of this patent is extended or adjusted under 35 U.S.C. 154(b) by 0 days.

(21) Appl. No.: 09/375,696

(22) Filed: Aug. 17, 1999

Related U.S. Application Data

(63) Continuation of application No. PCT/US98/03249, filed on Feb. 20, 1998.
(60) Provisional application No. 60/039,680, filed on Feb. 21, 1997.

(51) Int. Cl.$^7$ .................................................. G06K 9/00
(52) U.S. Cl. .......................................... 382/168; 382/172
(58) Field of Search .................................. 382/168, 169, 382/172, 132, 271, 273, 274

(56) References Cited

U.S. PATENT DOCUMENTS

| | | | |
|---|---|---|---|
| 4,868,051 | 9/1989 | Chou et al. | 358/111 |
| 5,046,118 * | 9/1991 | Ajewola et al. | 358/445 |
| 5,164,993 * | 11/1992 | Capozzi et al. | 382/132 |
| 5,313,063 | 5/1994 | Netzer | 250/334 |
| 5,315,101 | 5/1994 | Hughes et al. | 250/208.1 |
| 5,633,511 | 5/1997 | Lee et al. | 250/587 |
| 5,675,624 | 10/1997 | Relihan et al. | 378/98.7 |

* cited by examiner

*Primary Examiner*—Phuoc Tran
(74) *Attorney, Agent, or Firm*—Ratner & Prestia

(57) ABSTRACT

A method for automatically identifying the range of useful digital values to be displayed on a display medium and providing an appropriate gray scale transfer to optimize the diagnostic value of the final displayed image. One or more gray scale transfer functions corresponding to desired display media, one or more sets of experimentally determined constants, and one or more sets of algorithms are stored in a computer memory. A smoothed histogram and its histogram integral are constructed representing the frequency of occurrence of the digital values stored in the data bank. A low point and an edge point are identified from the histogram and integral, and based on the type of radiographic examination selected, are used with appropriate constants and algorithms to calculate a maximum and minimum value. Values lower than the minimum are replaced with the minimum, and values higher than the maximum are replaced by the maximum. The new range of values are mapped using the appropriate gray scale transfer function to a set of values displayed on the display medium.

5 Claims, 4 Drawing Sheets

IMAGE DATA PROCESSING FOR DIGITAL X-RAY DETECTORS

This application is a continuation of International Application No. PCT/US98/03249, international filing date Feb. 20, 1998. This application claims the priority of U.S. provisional application No. 60/039,680, filed Feb. 21, 1997.

FIELD OF THE INVENTION

This invention relates to a method for displaying an image composed of a plurality of digital values, and more particularly to a method for mapping a plurality of digital values onto a gray scale transfer function of a display medium, to display a radiogram.

BACKGROUND OF THE INVENTION

There exists significant activity in the development of digital x-ray image data capture systems. In such systems direct conversion to an electrical signal of the incident radiation is obtained using a plurality of sensors in an array. The sensor output is almost invariably immediately converted to a digital signal and further processed and stored in a databank for use in the eventual display of the data as a radiogram. U.S. Pat. No. 5,313,066 issued to Lee et al. and U.S. Pat. No. 5,315,101 issued to Hughes et al describe typical such sensor arrays and their contents are incorporated herein by reference. Even though several different technologies are being utilized, the output data is quite similar.

A major advantage of digital data detection systems is the wide dynamic range of signal capture. Display media, such as radiographic film or Cathode Ray Tube (CRT) displays, on the other hand, have a substantially more limited dynamic range. A typical digital x-ray capture system can have a useful dynamic detection range of greater than a 1,000:1. However, the useful image data is generally limited to a dynamic range of less than 100:1. There is, therefore, need to determine and select the optimal limited range of useful data for diagnostic display, and then properly display such range on the available display medium.

This problem which reduces to a need for a method whereby the exposure sensor output is mapped onto the display device density transfer function has been addressed by the art in numerous ways. Typically the sensor output is digitized and a histogram of the frequency of occurrence of digital values representing detected exposure is constructed. Following construction of the histogram, cutoff points eliminating values under selected minimum occurrence for both ends of the scale are determined and the digital values in the remaining range are mapped onto the display transfer function. These steps are rather fundamental and intuitive. What is significant and the subject of continuing research is the specific selection process for the two cutoff points and the manner in which the remaining density values are actually mapped on the transfer function.

U.S. Pat. No. 5,164,993 issued Nov. 17, 1992 to Capozzi et al. together with U.S. Pat. Nos. 5,046,118 issued to Ajewole et al. and 4,868,651 issued to Chou et al. are believed to represent the current state of the art in explaining and solving the problems associated with such displays.

The currently available solutions do not adequately address the problem of adapting the digital value mapping to a particular type of both patient and examination. For example, a different portion of the data generated by the radiation sensors is of interest in displaying a radiogram depending on whether the radiogram is one of an extremity or a chest cavity, whether the patient is thin or obese, and what is the area desired to be displayed with maximum diagnostic efficiency. There is, therefore, still need for a system which addresses these problems and which with simple operator input automatically maps the available data in a way as to optimize the display medium density range for a particular set of examination type, patient characteristics and display medium capabilities.

It is an object of this invention to provide a method for automatically identifying the range of useful digital values to be used for diagnostic display, and to provide an appropriate gray scale transfer to optimize the diagnostic value of the final displayed image, either hard or soft copy.

SUMMARY OF THE INVENTION

In its broadest aspect, the present invention is a method for displaying on a display medium an image comprising a plurality of pixels having various optical densities stored in a data bank as a plurality of digital values corresponding to a detected exposure for each of said plurality of pixels, the method comprising the following steps:

I) In a programmed computer comprising a memory, storing a first look-up table (LUT) representing at least one gray scale transfer function for the display medium, a second LUT containing a plurality of experimentally determined constants, and a plurality of algorithms;

II) Constructing a histogram representing the frequency of occurrence of a range of digital values stored in said data bank.

III) Obtaining the integral of the histogram;

IV) Determining a low point on the histogram, DVlow, corresponding to a first predetermined percentage of the histogram integral and a point DVedge wherein the histogram has dropped to a predetermined percentage from a peak value;

V) selecting a type of radiographic examination from a list of radiographic examinations, retrieving from the second LUT preset constant values related to the selected radiographic examination type and using a preselected one or more of the plurality of stored algorithms related to the examination type with the retrieved constants to calculate:
   a) a value DVmin,
   b) a value DVmax VI) Replacing all digital values in the data bank which are lower than DVmin with DVmin, and all digital values which are higher than DVmax, by DVmax to obtain a new range of data digital values.

VII) using the new range of data digital values to enter the first LUT and to obtain a mapped range of display data values and VIII) displaying the image on the display medium using the display data values.

In a preferred embodiment the algorithms stored in the memory for calculating DVmin and DVmax are:

1. $DVmax = DVmin + ((SF/C) \times Log(B))$; and
   $DVmin = DVlow - SF \times Log(A)$
2. $DVmax = DVmin + (SF \times Log(B) - \Delta Range)/C$ and
   $DVmin = DVmin - SF \times Log(A)$
3. $DVmax = DVmin + (1/L) \times (DVedge - DVmin)$ and
   $DVmin = (DVlow - SF \times Log(A)) - ((1/C) \times (DVedge - DVmin)) - DS$
4. $DVmax = DVmin + (1/L) \times (DVpeak - DVmin)$
   $DVmin = (DVlow - SF \times Log(A)) - DS$ In an alternate embodiment, the process uses a plurality of gray scale transfer functions stored in the first LUT, each such gray scale transfer function being adapted so that DVedge produces a preselected output density on the display medium, such density being dependent on a specific desired visual appearance of the displayed data selected by the viewer. In essence, this multiplicity of gray scale transfer functions provides the operator with the ability to simulate in digital radiography the possibility of using different type photographic films and film screen combinations in traditional radiography, to optimize the visual appearance of the radiogram.

DESCRIPTION OF THE INVENTION

In a typical direct image capture set up there is a source of imaging radiation which may be x-ray radiation, a patient and a radiation detector. The patient is placed in the path of the radiation and the detector is also placed in the radiation path in a position to intercept the radiation after it has traversed the patient.

Direct radiation image capturing devices typically comprise a plurality of discreet sensors arrayed in a two dimensional array. The sensors generate and store an electrical charge that is directly proportional to the intensity and duration of the radiation incident on the sensor.

The stored charges represent the relative exposure of each sensor to the radiation. In their totality they represent a two-dimensional image of the intensity of the radiation, also known as radiation flux density, incident on the two dimensional array. The charges are next readout usually in a prescribed sequence. Readout of the stored charges produces electrical signals representing the sensor's exposure. Following amplification and noise filtering the electrical signals which typically are analog signals at this point, are almost always converted to digital values representing the relative exposure of each sensor. The digital values are stored in a data storage medium referred to herein as a data bank. Storage is in a manner that permits the accurate two-dimensional reconstruction of the charge distribution initially stored on the array.

Figure 1:
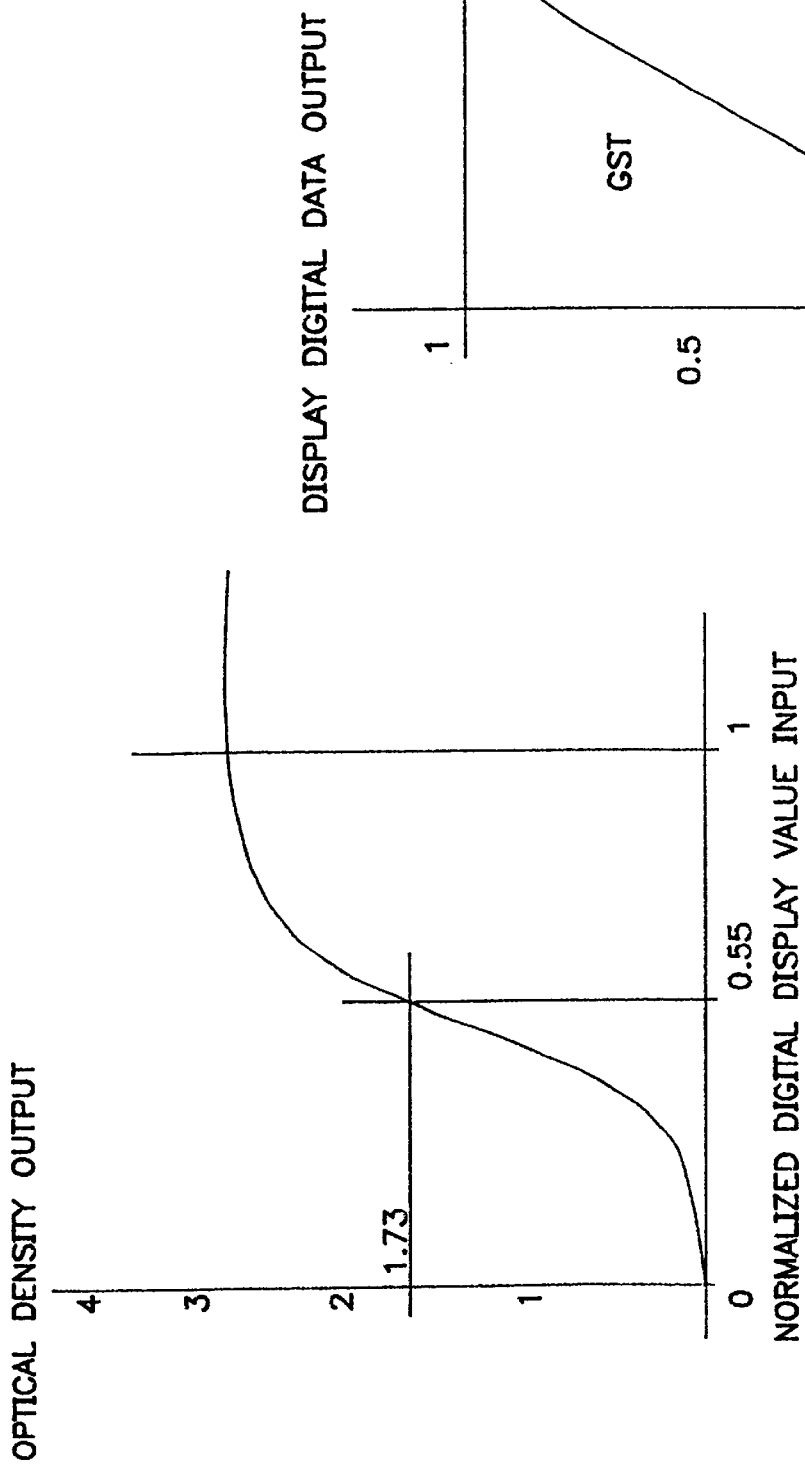
FIG. 1 is a graphic representation showing a typical gray scale transfer function for a display medium giving the resulting optical density as a function of input digital values.

In displaying an image, digital values are used as an input to a display apparatus to produce a gray scale representation on a display screen or to expose a photosensitive film. FIG. 1 shows a typical transfer function that represents the digital values input to the apparatus and the corresponding optical density in the display. In this example the display medium is a photosensitive film having a maximum density of about 3.0.

The information in the data bank is used for displaying a visual image of the charge distribution in the form of a two dimensional distribution of gray scale values each value corresponding to the accumulated charge by each of the sensors in the array. These charges form the picture elements or pixels that constitute the displayed image.

The digital values stored in the data bank are raw values in the sense that they are a numerical representation of the magnitude of the charge generated and stored in the radiation detectors as a result of their exposure to radiation. This charge magnitude as a function of exposure is most often a linear relationship that extends over a wide dynamic range. A direct representation of the stored information on the display, whether it is film or CRT typically results in a lot of information getting lost due to the compression of the data dynamic range to fit within the display dynamic range limitations. To prevent this the present invention uses a histogram of the digital values stored in the databank. A smoothing function is applied to the histogram, and the histogram is then used to ascertain whether a particular value represents useful information and what gray scale level to allocate to each value.

A histogram of the digital values representing the incident x-ray flux density on the detector will give an indication of the range of useful image data values to be utilized for generating the display image. In order to limit the size of the data blocks to be handled, it is preferred that the histogram be constructed using logarithmic data values and still more preferably by placing the data in "bins" of a number of discrete data values.

Figure 2:
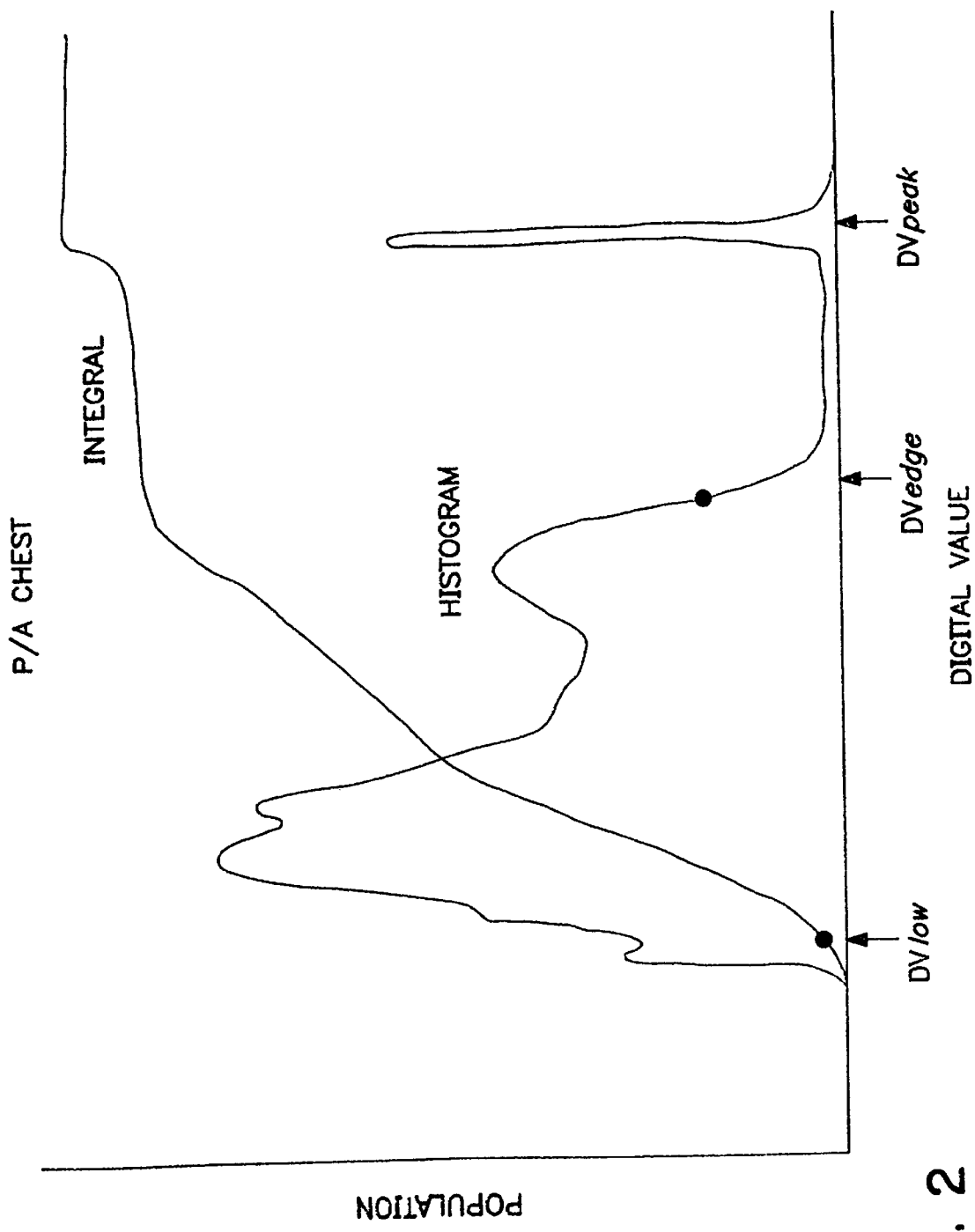
FIG. 2 shows a typical chest P/A image histogram obtained according to this invention and the corresponding integral of that histogram.

FIG. 2 shows a typical such histogram. According to the present invention, we extract three (3) primary reference values from the histogram and histogram integral data.

These three values are then used with exam specific parameters in mathematical algorithms to derive a minimum digital value (DVmin) and a maximum digital value (DVmax) for utilization in selecting the data best suited for producing the final display image.

The point of beginning common to all types of images and examination types displayed under this invention, is the identification of a low reference point DVlow and the use of this point to calculate a minimum value DVmin which will define a cutoff point for the data to be used in the mapping and display of the data. Identification of a beginning point, DVlow, can be rather indefinite if only the histogram population values are used. It was found that a more definitive value could be derived by utilizing the integral of the histogram values. A digital value (DVlow) that corresponds to a percentage of the integral of the histogram, for instance five percent (5%) of the total integral, provides a reliable reference for finding DVlow and calculating the digital value (DVmin) for display purposes.

A second reference point DVpeak is identified as follows. Beginning at the far right end of the histogram integral and advancing from right to left, identify the first point where the slope of the integral first changes direction. This point corresponds to DVpeak on the histogram. Alternatively, DVpeak may be identified by traversing the histogram from left to right and identifying the next highest peak in the histogram following DVedge.

DVedge is identified on the histogram as the point where the histogram population drops to less than a preselected percentage of the highest preceding peak as the histogram is scanned from left to right. In a typical chest radiogram, such DVedge is selected at the point where the population count of the histogram is 75% below the count at the highest preceding point. To find this point, we first store the highest histogram population value as we scan through the histogram, starting at DVlow. The histogram digital value where the population drops to less than 25% of the highest peak is next identified, stored, and assigned to DVedge. DVedge for different anatomical examinations will be somewhat different. Typical percentages are between 15% and 35%, even though values outside these limits may also produce acceptable results in displaying certain types of images.

These reference points are used in identifying the data that will be used to display images for specific types of anatomical examinations.

Calculation of DVmin & DVmax:

Referring now to FIG. 2 there is shown a typical histogram representing the distribution of the digital values DV obtained from the sensor. In this instance in accordance with the preferred embodiment of this invention, DV represents logarithmic values, that is the distribution of the logarithm of the output raw digital values, and more particularly, a smoothed histogram with bins of 20 values each, rather than a plot of the individual digital values obtained. Further more the original data values were represented in 16-bit format and were compressed to a 12-bit format prior to the histogram construction. The compression and resulting required factor SF in the algorithms is explained later in this description.

Using the integral of the histogram we have selected as DVlow the 50% point on the integral curve. Other percentage values may of course be determined as proper selection point. This point is used to extract the reference value DVlow from the histogram data. Once DVlow has been identified, DVmin is calculated using an exam specific constant "A". Constant "A" is used to determine the lowest digital value to be included in the image display. Constant "A" and an associated paired constant "B" are experimentally determined constants which are derived for different type of radiographic images, such as chest, extremities, skull, abdominal etc., and are stored in a second LUT. Selection by the operator of anyone desired examination type, automatically retrieves the appropriate constants from the second LUT, together with the preselected algorithms which produce the proper DVmin and DVmax values for display.

A scale factor (SF), used in the algorithms, is related to the histogram construction. In the preferred mode, in constructing the histogram, rather than using the individual digital exposure values, bins containing a number of sequential values are used. For instance each bin may include 20 sequential digital values, and 20 would be the bin size. Thus in a case where the digital system is a 12 bit system, there are 4096 discreet values which may be reduced to 205 by dividing the range into segments (bins) of 20 sequential values and plotting the frequency of occurrence of any value within a bin as single value.

The scale factor is also related to the logarithmic conversion of the raw data from the sensors. For instance, in a typical radiographic system the dynamic range of the radiation exposure, that is the radiation levels multiplied by the duration of the exposure, may be from $10 \times 10E^6$ roentgens to $100{,}000 \times 10E^6$ roentgens, or 10,000 to 1. This range is captured following logarithmic conversion and digitization in a 12-bit system in 4096 log values. The scale factor SF is defined as:

SF=(Number of log values)/(log of dynamic range×Bin size)

or for the example given above:

SF=4096/(log (10,000)×20) or SF=51.2

In a preferred embodiment a practical exposure range of 600 to 1 is used, producing a SF=73.7.

The constant "A" is selected from a list of constants stored in the second LUT based on the type of radiogram involved. For instance if the radiogram is a chest radiogram, the chest radiogram selection initiated by the operator automatically, uses the assigned value to constant "A" for such type of examination in calculating DVmin.

Once a DVmin value is determined, DVmax is calculated. Because the range of available densities in the form of digital values exceeds the range of densities that can be displayed in any one particular display medium, a useful range of values for dis3play of digital values can be identified for a specified diagnosis. Thus, a predetermined exam specific dynamic range of digital values can be prescribed to be included in the display data. To identify the useful range there have been developed four pairs of algorithms each corresponding to a particular type of examination. These are:

1. DVmax=DVmin+((SF/C)×Log, (B)); and
   DVmin=DVlow−SF×Log (A)
2. DVmax=DVmin+(SF×Log (B)−ΔRange)/C and
   DVmin=DVlow−SF×Log (A)
3. DVmax=DVmin+(1/L)×(DVedge−DVmin) and
   DVmin=(DVlow−SF×Log (A))−((1/C)×(DVedge−DVmin))−DS
4. DVmax=DVmin+(1/L)×(DVpeak−DVmin)
   DVmin=(DVlow−SF×Log (A))−DS where: "B" is a constant paired with constant "A".

"L" is a constant related to the optical density desired for a particular digital value.

"ΔRange"=DVedge−DVlow.

"C" is a constant related to image contrast whose default value is C=1.

"DS" is a density shift factor whose default value is DS=0.

Preferably all constant are stored in the second LUT.

While it is preferred that values for "L" be precalculated and stored in the LUT for different types of examinations, "L" may be calculated each time based on the actual data obtained and on a decision to display values corresponding to DVedge as a particular density in the displayed image.

For example, if DVedge corresponds to the maximum translucency of the lung field, it is typically displayed with an optical density (OD) value of 1.7 in the displayed image. From the gray scale transfer curve it is determined that to obtain an OD=1.7 the exposure given must be 55% of the full exposure range available for the display medium. The GST function has been normalized from 0–1, so the normalization of the digital values must be such that DVedge becomes 0.55. In other words, the values between DVedge and DVmin are fixed to correspond to 55% of the digital value range between DVmax and DVmin. For convenience, we designate this exam specific parameter "L". L=(DVedge−DVmin)/(DVmax−DVmin)=DV needed to produce a desired density output. (obtained using the gray transfer functions of FIGS. 1 and 5). DS is an optical density shift factor that may optionally be used to produce a uniform shift in the digital value range such that the display image will be shifted in optical density (or brightness) with no change in contrast. This is done by subtracting or adding a constant from or to both DVmin and DVmax which in effect shifts the range of selected digital values up or down uniformly without changing the overall DVmax-DVmin range.

C determines changes in the contrast. Contrast shift is done by an increase or decrease in the digital value range.

The values of DS and C will depend on the type of display appearance of the selected exam type as they represent contrast and brightness controls.

In practice a typical system may include the following parameters that are selected by the operator to display images for different examinations:

PARAMETER LUT:

| EXAM TYPE | A | B | Algorithm | L | GST | C | DS |
|---|---|---|---|---|---|---|---|
| 1 | 5 | — | 3 | 0.57 | F(ilm) | 1 | — |
| 2 | 5 | — | 3 | 0.47 | F | 1 | — |
| 3 | 2 | 70 | 2 | — | F | 2 | 0 |
| 4 | 3 | — | 4 | — | F | 1 | 0 |
| 5 | Appropriate combinations of algorithms and constants. | | | | | | |

Figure 3:
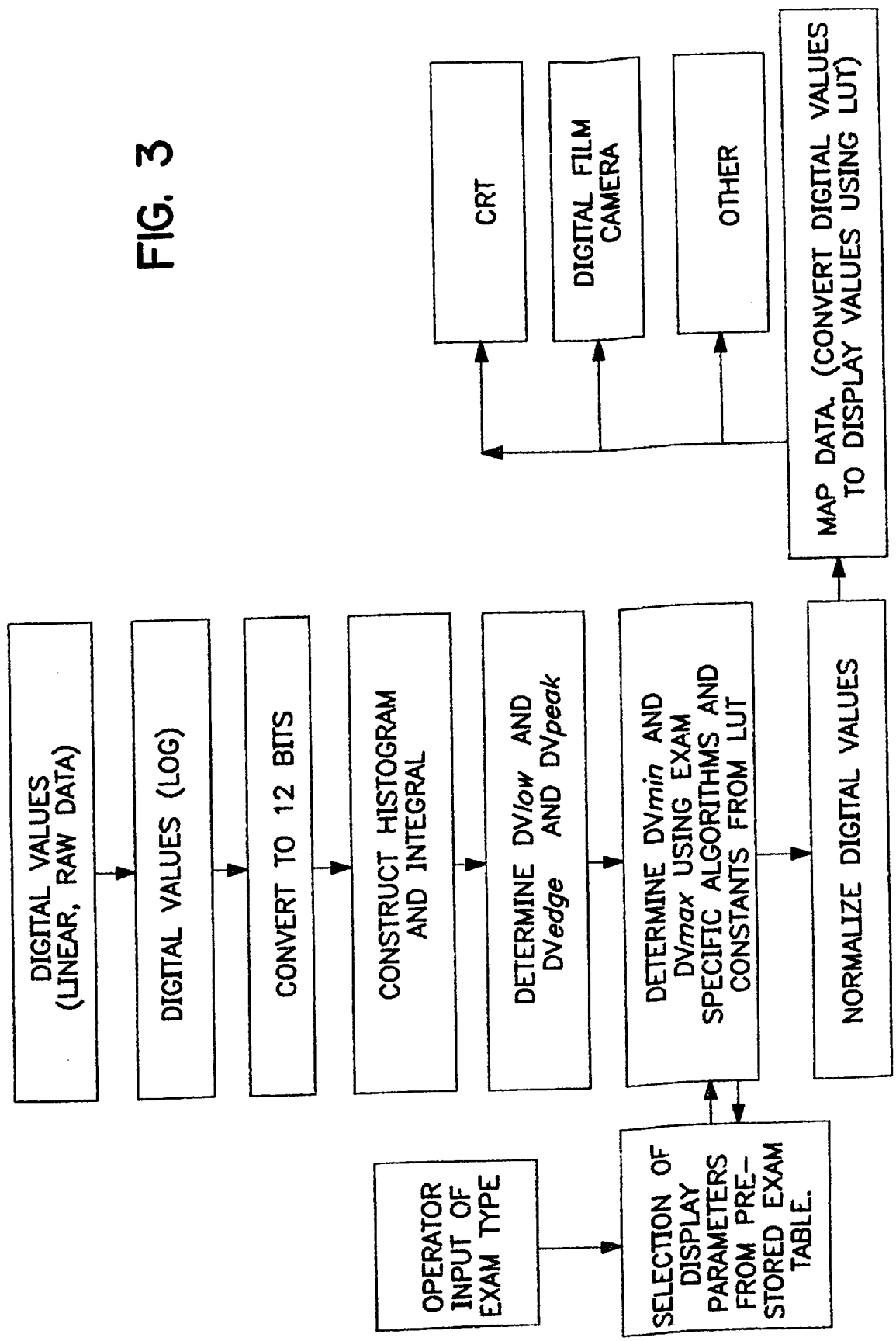
FIG. 3 shows a flow diagram showing the sequence of steps in performing the method of this invention.
Figure 4:
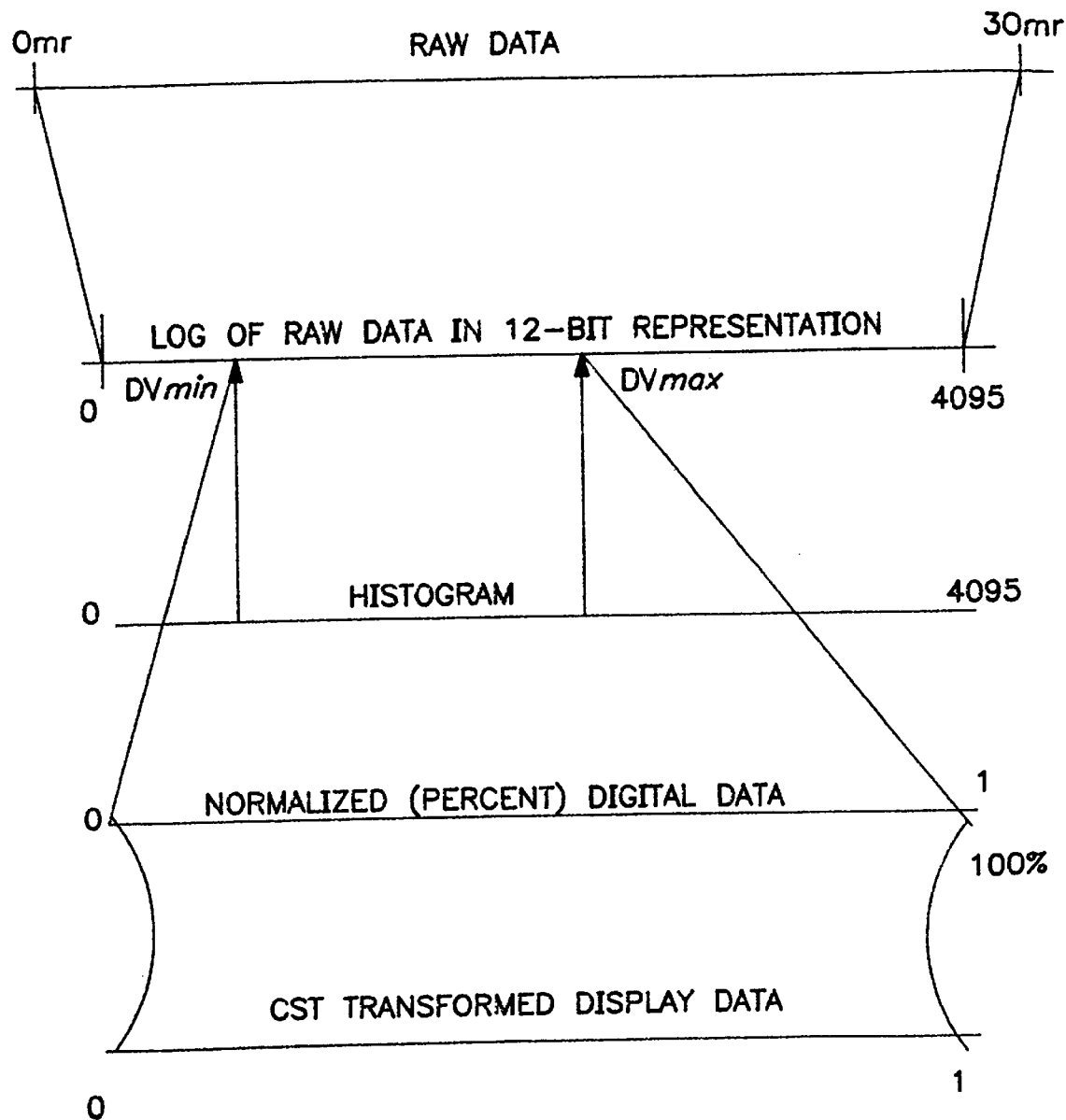
FIG. 4 shows a schematic representation of the data transformation and mapping, according to the present process.

EXAMINATION/IMAGE TYPE INPUT:
1 Chest - PA/AP
2 Chest - lateral
3 Skull
4 Extremity
5 Other The operation of the data mapping process which results in an image display having the desirable characteristics for a particular type of anatomic display and display medium will next be explained with reference to FIGS. 3 and 4. The process is performed in a computer that includes a CPU and a memory. Stored in the memory are the algorithms and the different coefficients as well as a control program that selects and applies a particular algorithm and appropriate coefficients based on an examination type input ordered by an operator. Such equipment is readily available and well known in the art. The computer is typically directly linked to the Radiation sensor controller and includes a connector for inputting the data output of the sensor. The computer output is used to control an exposure device that displays the latent image represented by the sensor output.

The operator first selects the type of examination for the display. A number of exam specific combination of algorithms and constants are available and are preferably automatically selected by a simple keystroke. All this technology is well known in the art relating to computer controlling and performing preprogrammed operations.

Following exposure to X-ray radiation the individual pixel sensors receive an exposure that may vary from between DmR (or more practically 0.05mR) to 30 mR and produce a charge that is linearly proportional to the exposure level received in each sensor. Following readout of the stored charges in the sensors and initial amplification of the original analog signal, the output is converted from an analog to a digital set of values. These values are still expressed in the linear domain. These raw data values are next converted into the logarithmic domain.

The next step in the present process employs a histogram construction and analysis to determine the useful range of these values. A histogram is constricted using the frequency of occurrence of the log of the digital values as shown in FIG. 2. In addition to the histogram there is also derived a curve representing the integral of the histogram also shown in FIG. 2. From the histogram and its integral the following information is extracted, as described above:

1) DVlow
2) DVhigh
3) DVedge

Having obtained DVlow and based on the operator's selection of examination type, the corresponding algorithms and constants are extracted and DVmin and DVmax values are determined, giving the range of digital values which will be used in displaying the captured image. Any value above or below the DVmax and DVmin respectively is given the respective DVmax and DVmin value for display purposes.

Figure 5:
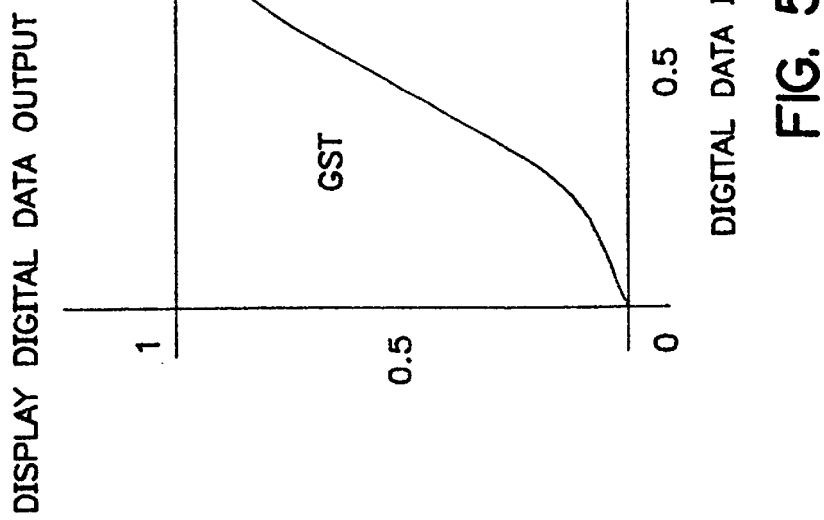
FIG. 5 is a graphic representation of the values stored in the first LUT showing a typical gray scale transfer function for a display medium giving the resulting optical density as a function of input digital values.

The range of values between DVmin and DVmax is next converted into percentage values, with DVmin=0% and DVmax=100%. Preferably this conversion is represented as the normalization of the data spread with the new range being, between 0 and 1. The percentage or normalized values which represents a new range of digital values are used to enter a lookup table representing the gray scale transfer function for the particular medium on which the image is to be displayed and are converted to a new set of digital values, referred to as the mapped display data. FIG. 5 shows this process, wherein for each input digital value there is a corresponding output value. The mapped display digital values are next sent to the apparatus used for generating the display.

It is preferred that a plurality of GST functions be stored in the LUT each representing a different response, somewhat akin to using different contrast and speed film in traditional radiography. In such manner a different display may be provided for the same data permitting the display to be tailored to a particular individual's taste. A particular function may then be selected for use, providing extra flexibility.

Throughout this description there is reference to experimentally determined constants used in this invention for deciding DVmax and DVmin. The constants are determined by first entering a value in the equation and observing a displayed image. A decision as to what constitutes an image of good diagnostic quality is a highly personal one and the selection of constants that will produce the best image for all people in all instances is not a realistic undertaking. Through experimentation and experience typical constant values for A, B, L, and C, are given in the table above and can be used by the user of the present invention as guidance. If the resulting displays are not to his satisfaction, these values provide a good starting point towards the development of other values that may produce subjectively better results.

It is obvious that while the conversions and calculations may be done in hardware with operator input at various stages the computational portion of this process is best be done using a computer appropriately programmed. It is also obvious that those skilled in the art having the benefit of the above description can make numerous modifications particularly as to the actual numerical values used in the examples given above. Any such modifications are to be construed as encompassed within the scope of my invention as hereinbelow claimed.

What is claimed is:

1. A method for displaying on a display medium an image comprising a plurality of pixels having various optical densities stored in a data bank as a plurality of digital values corresponding to a detected exposure for each of said plurality of pixels, the method comprising the following steps:

I) in a programmed computer comprising a memory, storing a first LUT representing at least one gray scale transfer function for the display medium, a second LUT containing a plurality of experimentally determined constants, and a plurality of algorithms;

II) constructing a histogram representing the frequency of occurrence of a range of digital values stored in said data bank, III) obtaining the integral of the histogram;

IV) determining a low point on the histogram, DVlow, corresponding to a first predetermined percentage of the histogram integral and a point DVedge, wherein the histogram has dropped to a predetermined percentage from a peak value;

V) selecting a type of radiographic examination from a list of radiographic examinations, retrieving from the second LUT preset constant values related to the selected radiographic examination type and using a preselected one or more of the stored plurality of algorithms related to the examination type with the retrieved constants to calculate:
  a) a value DVmin,
  b) a value DVmax;

VI) replacing all digital values in the data bank which are lower than DVmin with DVmin, and all digital values which are higher than DVmax, by DVmax to obtain a new range of data digital values, VII) using the new range of data digital values to enter the first LUT and to obtain a mapped range of display data values; and VIII) displaying the image on the display medium using the display data values.

2. The method of claim 1 wherein the plurality of algorithms comprise the following sets:
1. DVmax=DVmin+((SF/C)×Log (B)); and
   DVmin=DVlow−SF×Log (A)
2. DVmax=DVmin+(SF×Log (B)−ΔRange)/C and
   DVmin=DVlow−SF×Log (A)
3. DVmax=DVmin+(1/L)×(DVedge−DVmin) and
   DVmin=(DVlow−SF×Log (A))−((1/C)×(DVedge−DVmin))−DS
4. DVmax=DVmin+(1/L)×(DVpeak−DVmin)
   DVmin=(DVlow−SF×Log (A))−DS and wherein A, B, C, L, and DS are constants stored in the second LUT having predetermined values and wherein the selected values for use with the algorithms are dependent on the type of examination selected.

3. The method of claim 2 wherein DVlow corresponds to between 1% and 10% of the histogram integral.

4. The method of claim 2 wherein DVlow is 5% of the histogram integral.

5. The method according to claim 3 wherein DVedge is a point along the histogram where the histogram value has dropped to 25% of its preceding peak value.

* * * * *